Figures 1, 2:
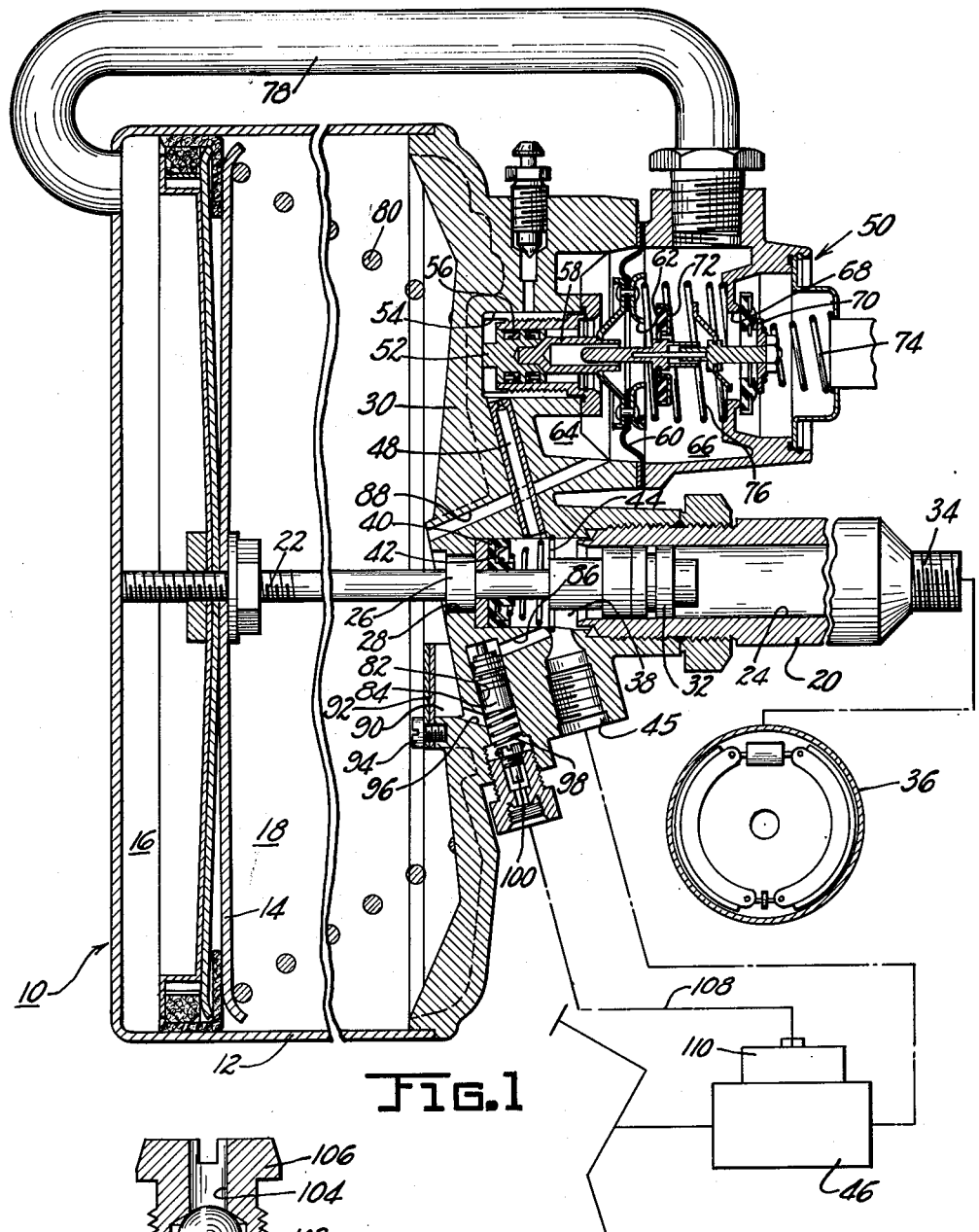

March 17, 1953 — T. H. THOMAS — 2,631,433
FLUID SCAVENGING DEVICE
Filed Jan. 13, 1951

INVENTOR.
THOMAS H. THOMAS
BY
G. A. Gust
ATTORNEY

Patented Mar. 17, 1953

2,631,433

UNITED STATES PATENT OFFICE 2,631,433

FLUID SCAVENGING DEVICE

Thomas H. Thomas, South Bend, Ind., assignor to Bendix Aviation Corporation, South Bend, Ind., a corporation of Delaware Application January 13, 1951, Serial No. 205,885

7 Claims. (Cl. 60—54.5)

The present invention relates to power devices for hydraulic pressure systems, particularly hydraulic brake systems wherein the usual manually operated master cylinder and wheel cylinders or motors are provided. In such systems, the power device is usually controlled by valve mechanism, which in turn is controlled by the hydraulic pressure developed by the manually operated master cylinder.

Heretofore, the hydraulic leakage in such power devices, which emanates from the valve mechanism and/or other parts of the power device, flowed into the power device chambers and spaces where it was not wanted, and in order to insure against such leakage, rubber or the like seals were used. Inevitably, after a certain period of use, these seals became worn and leaky, and if the leakage was excessive, new seals had to be installed. Actually, however, a slight leakage around a seal is desirable from the standpoint that it lubricates the rubbing surface of the seal and thus noticeably reduces seal wear. Excessive leakage will obviously make the unit inoperative.

It is, therefore, an object of the present invention to provide a fluid scavenging device for a power unit which will collect and discharge the fluids or liquids which leak around the various power unit seals. With the accomplishment of this object, the seals may be designed so as to allow a slight lubricating leakage which, as previously stated increases the seal life.

It is another object to provide a device for a power unit for gathering leakage fluid, and then discharging this fluid back into the hydraulic system which incorporates the power unit. Thus, leaked fluid is not lost but is retained in the system where it is reused.

Other objects will become apparent as the description proceeds.

In the drawing:

Figure 1 is a longitudinal section of a power unit which incorporates an embodiment of the present invention; and Figure 2 is an enlarged sectional view of a valve mechanism utilized in the embodiment of Figure 1.

Referring to the drawing, power unit 10 is shown as comprising a housing 12 which reciprocably carries a piston 14 which in turn defines two variable volume chambers 16 and 18. In the illustrated power unit, these chambers 16 and 18 are normally evacuated, so that the piston 14 is submerged in vacuum; however, it is to be understood that the present invention may also be used with a power unit operated by super-atmospheric pressures. Extending outwardly from one end of the housing 12 is a liquid-containing slave cylinder 20. This cylinder 20 is so located that the force transmitting rod 22, rigidly secured at its left end to piston 14, will concentrically project into the bore 24 of cylinder 20. The alignment between rod 22 and the bore 24 is maintained by a centrally apertured guide ring 26 which is press fitted into a suitable opening 28 in the end wall 30 of housing 12. A piston 32 is reciprocably carried in bore 24 and is operatively connected to rod 22, so that rightward movement of power piston 14 will force piston 32 to the right to develop hydraulic pressure which is communicated from the slave cylinder outlet 34 to a hydraulic brake unit, diagramatically illustrated, 36.

An annular chamber 38 is provided at the rear of piston 32 and is normally filled with liquid. In order to prevent the flow or leakage of fluid from this chamber 38 to power chamber 18, an annular rubber, or the like, stationary seal 40 is slidably received on the rod 22 and positioned between the opening in the guide ring 26 and chamber 38. As illustrated, this seal 40 is biased toward the left by means of a frusto-conically shaped spring 42 which bears against a retaining washer 44 suitably secured against rightward movement in the chamber 38.

An inlet port 45 communicates at one end with chamber 38 and at its other end with a conventional manually operated master cylinder 46. A passage or conduit connection 48 is formed in end wall 30 and communicates with annular chamber 38 and the control valve mechanism generally indicated by reference numeral 50. In the control valve 50, this conduit connection 48 communicates with the head of the control valve piston 52 which is reciprocably carried in a cylinder bore 54 suitably formed in end wall 30. A movable sealing member 56 surrounds piston 52 to prevent the leakage of fluid there around.

The right-hand end of piston 52 is connected by means of a thrust link 58 to a diaphragm 60 which is centrally provided with a valve opening 62. This diaphragm 60 and its associated housing defines two variable volume chambers 64 and 66, chamber 64 being in constant communication with a suitable source of vacuum and chamber 66 being selectively connected with either the source of vacuum or air at atmospheric pressure. Chamber 66 is ported to the atmosphere by means of the valve opening 68 which is closed, in the illustration, by means of poppet 70. This poppet 70 has a non-compressible connection with larger poppet 72 which is arranged to control the opening and closing of the diaphragm port 62. As illustrated, the poppet 70 is normally closed by means of the compressed spring 74, and the diaphragm 60 is biased toward the left by means of the helical spring 76. A conduit 78 connects control valve chamber 66 with the power chamber 16.

The construction described thus far is conventional in most respects and operates as follows. The master cylinder 46 is operated to develop a hydraulic pressure which is transmitted through the inlet port 45 to the chamber 38. This same pressure is transmitted from chamber 38 to the head of control valve piston 52 by means of the conduit connection 48 advancing piston 52 toward the right until diaphragm opening 62 is engaged and closed by valve 72. Continued advancement of piston 52 unseats poppet 70 allowing air at atmospheric pressure to flow through opening 68 into control chamber 66. This increase in pressure in chamber 66 is communicated by means of conduit 78 to power chamber 16 where it acts on power piston 14. The piston 14 moves toward the right carrying with it the rod 22 and the piston 32. The liquid in the slave cylinder 20 is forced ahead of piston 32 to apply the brake 36. When it is desired to release the brake 36, the master cylinder 46 is retracted thereby relieving the hydraulic pressure communicated to the head of control valve piston 52. The diaphragm 60 is retracted by spring 76 and the differential of pressures over diaphragm 60, causing the diaphragm opening 62 to open and port 68 to be closed thereby restoring the vacuum to power chamber 16. There being no pressure differential over the power piston 14, the compression spring 80 will return this piston to its illustrated released position.

Now describing the fluid scavenging device which constitutes the subject matter of the present invention; a substantially vertical bore or chamber 82 is provided in end wall 30 and reciprocably carries therein the piston or pressure responsive member 84. The upper end of the bore 82 is connected with the annular chamber 38 by means of a passage 86. Another passage 88 connects the floor of control valve chamber 64 with the power chamber 18, passage 88 being inclined downwardly toward the left. Located directly beneath the left-hand opening of passage 88 and the opening in ring 26 is a collecting well 90 defined by a suitably shaped portion of the housing wall 30 and a sheet metal side 92 suitably secured to wall 30 by means of a screw 94 or the like. The bottom of this well 90 is connected with the bore 82 by the downwardly inclined passage 96. A helical spring 98 is positioned in bore 82 to keep the piston 84 properly spaced from a one-way conventional check valve 100 received in the open end of bore 82. This spring 98 is made strong enough to withstand the differential pressure over piston 84 which results from atmospheric pressure prevailing in chamber 38 and the vacuum in chamber 18.

Referring more particularly to Figure 2, this check valve 100 comprises a ball valve 102 biased to close the passage 104 through the valve body 106. This valve body is threaded into the outer end of bore 82 in such a position that fluid may flow out of bore 82 but not thereinto.

In operation, any liquid which may leak past the seal 56 of control valve piston 52 will drop onto the bottom of chamber 64 from which it drains through passage 88 into the collecting well 90. From this well 90, this leakage fluid enters the bore 82 by way of the passageway 96. Here the fluid is trapped until master cylinder 46 is operated, at which time the hydraulic pressure which is transmitted to chamber 38 and control valve piston 52 is likewise transmitted to the upper end of piston 84. This piston 84 is driven downwardly past the opening of passage 96 against the spring 98 and the fluid collected over the head of check valve 100, and its continued movement drives the trapped fluid out of the check valve and into the line 108 which is connected to the conventional master cylinder reservoir 110.

Leakage around the stationary seal 40 will also drain into the bore 82 and be discharged to the reservoir 110 as explained above.

Thus it is seen, that by the use of the liquid scavenging device above described, any liquid which escapes around seals 40 and 56 will be collected and discharged into the reserve supply of the hydraulic brake system. The seals 40 and 56 may be so designed as to allow for slight leakage therearound which will serve as a lubricant and thereby enhance the wear-life of these seals. As stated previously, leakage for any purpose whatsoever had been considered an undesirable thing; however, it is obvious that by using the present invention, slight leakage may be used to good advantage, and recovered for continued use.

Although only one embodiment of the invention has been illustrated and described, various changes in the form and relative arrangements of the parts may be made to suit requirements.

I claim:

1. For use in a differential air pressure power unit having a power cylinder defined by a housing, a slave cylinder secured to said housing, and a control valve for controlling the operation of the power cylinder; a fluid recovery device comprising a substantially vertical bore in one wall of said housing, a piston reciprocably received in said bore, a one-way check valve positioned in the outer end of said bore and arranged to prevent the flow of fluid into said bore but to allow the flow therefrom, a conduit connection communicating with the interior of said slave cylinder and the control valve, said conduit connection being adapted to be connected to a manually operable master cylinder which, when operated, effects actuation of the control valve, a passage connecting said bore on the side of said piston opposite said check valve to said conduit connection, a helical spring interposed between said piston and said check valve, and a well provided on a wall of said housing and having an outlet draining into said bore between said piston and said check valve, said well serving to gather leakage fluid for delivery out of said outlet, actuation of the aforementioned master cylinder serving to transmit a fluid pressure to said conduit connection for operating the power unit, said fluid pressure also being communicated through said passage to said bore for moving said piston to force the leakage fluid trapped in said bore through said check valve.

2. For use in a differential air pressure power unit having a power cylinder defined by a housing, a slave cylinder secured to said housing, and a control valve for controlling the operation of the power cylinder; a fluid recovery device comprising a bore in one wall of said housing, a piston reciprocably received in said bore, a one-way check valve positioned in the outer end of said bore and arranged to prevent the flow of fluid into said bore but to allow the flow therefrom, a conduit connection communicating with the interior of said slave cylinder and the control valve, said conduit connection being adapted to be connected to a manually operable master cylinder which, when operated, effects actuation of the control valve, a passage connecting said bore on the side of said piston opposite said check valve to said conduit connection, a well provided on a wall of said housing and having an outlet draining into said bore between said piston and said check valve, said well serving to gather leakage fluid for delivery into said bore, and a passageway leading from the control valve to the mouth of said well whereby fluid leaked from the control valve will pass through said passageway and into said well.

3. For use in a differential air pressure power unit having a power cylinder defined by a housing, a slave cylinder secured to said housing, and a control valve for controlling the operation of the power cylinder; a fluid recovery device comprising a bore in one wall of said housing, a piston reciprocably received in said bore, a conduit connection communicating with the interior of said slave cylinder and the control valve, said conduit connection being adapted to be connected to a manually operable master cylinder which, when operated, effects actuation of the control valve, a passage connecting said bore to said conduit connection, and a well provided on a wall of said housing and having an outlet draining into said bore on the side of said piston opposite said passage, said well serving to gather leakage fluid for delivery out of said outlet whereby actuation of the aforementioned master cylinder will transmit a fluid pressure through said passage to said bore for moving said piston to force the leakage fluid out of said bore.

4. For use in a differential air pressure power unit having a power cylinder defined by a housing, a slave cylinder secured to said housing, and a control valve for controlling the operation of the power cylinder; a fluid recovery device comprising a bore in one wall of said housing, a piston reciprocably received in said bore, a one-way check valve positioned in the outer end of said bore and arranged to prevent the flow of fluid into said bore but to allow the flow therefrom, a compressible resilient member separating said piston from said check valve, a conduit connection communicating with the interior of said slave cylinder and the control valve, said conduit connection being adapted to be connected to a manually operable master cylinder which, when operated, effects actuation of the control valve, a passage connecting said bore on the side of said piston opposite said check valve to said conduit connection, and a well provided on a wall of said housing and having an outlet draining into said bore between said piston and said check valve, said well serving to gather leakage fluid for delivery out of said outlet, actuation of the aforementioned master cylinder serving to transmit a fluid pressure to said conduit connection for operating the power unit, said fluid pressure also being communicated through said passage to said bore for moving said piston to force the leakage fluid lying in said bore through said check valve.

5. For use in a differential air pressure power unit having a power cylinder defined by a housing, a slave cylinder secured to said housing, and a control valve for controlling the operation of the power cylinder; a fluid recovery device comprising a bore in one wall of said housing, a piston reciprocably received in said bore, a conduit connection communicating with the interior of said slave cylinder and the control valve, said conduit connection being adapted to be connected to a manually operable master cylinder which, when operated, effects actuation of the control valve, a passage connecting said bore to said conduit connection, and means arranged to gather and deliver fluid leaked from the control valve and the slave cylinder to said bore on the side of said piston opposite said passage, actuation of the aforementioned master cylinder serving to transmit fluid pressure into said conduit connection and into said bore where it acts against said piston to force the leakage fluid out of said bore.

6. For use in a differential air pressure power unit having a power cylinder defined by a housing, a slave cylinder secured to said housing, and a control valve for controlling the operation of the power cylinder; a fluid recovery device comprising a chamber provided on one wall of said housing, a fluid pressure responsive member movable in said chamber, a conduit connection communicating with the interior of said slave cylinder and the control valve, said conduit connection being adapted to be connected to a manually operable master cylinder which, when operated, effects actuation of the control valve, a passage connecting said chamber to said conduit connection, and means arranged to gather and deliver fluid leaked from the control valve and the slave cylinder to said chamber on the side of said member opposite said passage, actuation of the aforementioned master cylinder serving to transmit fluid pressure into said conduit connection and into said chamber where it acts against said member to force the leakage fluid out of said chamber.

7. For use with a differential air pressure power unit operable by means of liquid pressure, a liquid recovery device comprising a chamber having a pressure responsive member movable therein, means communicating the liquid pressure used to operate the power unit to said chamber, and means arranged to gather and deliver liquid leaked from certain parts of said power unit to said chamber on the side of said member opposite the first named means, the liquid pressure transmitted to said power unit also being transmitted by said first named means to said member where it acts against said member to force leakage fluid out of said chamber.

THOMAS H. THOMAS.

REFERENCES CITED

The following references are of record in the file of this patent:

UNITED STATES PATENTS

| Number | Name | Date |
|---|---|---|
| 2,526,236 | Ingres | Oct. 17, 1950 |